(12) United States Patent
Sorensen

(10) Patent No.: US 8,109,733 B2
(45) Date of Patent: Feb. 7, 2012

(54) VARIABLE SPEED HUB

(75) Inventor: Tommy Sorensen, Lemming (DK)

(73) Assignee: LM Glasfiber A/S, Lunderskov (DK)

( * ) Notice: Subject to any disclaimer, the term of this patent is extended or adjusted under 35 U.S.C. 154(b) by 825 days.

(21) Appl. No.: 12/087,145

(22) PCT Filed: Dec. 28, 2006

(86) PCT No.: PCT/DK2006/000747
§ 371 (c)(1),
(2), (4) Date: Jun. 26, 2008

(87) PCT Pub. No.: WO2007/073736
PCT Pub. Date: Jul. 5, 2007

(65) Prior Publication Data
US 2009/0022589 A1   Jan. 22, 2009

(30) Foreign Application Priority Data
Dec. 29, 2005 (DK) ................................. 2005 01847

(51) Int. Cl.
*F03D 11/02* (2006.01)
*F03D 7/00* (2006.01)
*F03D 9/00* (2006.01)

(52) U.S. Cl. ................ 416/203; 416/1; 416/33; 416/61; 290/55

(58) Field of Classification Search ........................ None
See application file for complete search history.

(56) References Cited

U.S. PATENT DOCUMENTS

| 1,403,069 A | * | 1/1922 | Burne | 416/132 R |
| 2,015,777 A | * | 10/1935 | Belding | 416/132 R |
| 2,050,142 A | * | 8/1936 | White | 416/135 |
| 4,197,053 A | * | 4/1980 | Reinke | 416/91 |
| 4,218,184 A | * | 8/1980 | McPherson et al. | 416/17 |

(Continued)

FOREIGN PATENT DOCUMENTS

EP   0 438 189   7/1991

(Continued)

OTHER PUBLICATIONS

"Windkraftanlagen" 1996, Hau E. Springer Verlag, Berlin, DE XP 002427504.

*Primary Examiner* — Scott B Geyer
(74) *Attorney, Agent, or Firm* — The Nath Law Group; Jerald L. Meyer

(57) ABSTRACT

A method of adjusting the speed of blades rotating in a rotor plane on a wind turbine, wherein the angle between at least two blades in the rotor plane is changed, whereby the tip speed of each individual blade can be optimised relative to the current speed of the wind experienced by the blade. Hereby it is possible to take into consideration the variation of the wind as a function of the height above ground level, and the yield of the wind turbine can be increased. The angular displacement of each blade can be changed individually independently of the remainder of the blades and cyclically. The method also comprises that each blade is accelerated on its way upwards in the rotation cycle and decelerated on its way down. Further details are provided about a system for controlling blades in a wind turbine comprising one or more wind speed meters, position meters, and/or acceleration meters, based on which parameters control of the angular displacement of each blade in the rotor plane is performed.

15 Claims, 7 Drawing Sheets

U.S. PATENT DOCUMENTS

| | | | |
|---|---|---|---|
| 4,426,192 A * | 1/1984 | Chertok et al. | 416/1 |
| 4,673,822 A * | 6/1987 | Kikuchi | 290/44 |
| 5,183,383 A * | 2/1993 | Baas | 416/9 |
| 5,226,805 A * | 7/1993 | Proven | 416/132 A |
| 6,604,907 B1 | 8/2003 | Lehnhoff | |
| 7,071,578 B1 * | 7/2006 | Shibata et al. | 290/55 |
| 2005/0200135 A1 | 9/2005 | Shibata et al. | |
| 2005/0201862 A1 * | 9/2005 | Wastling et al. | 416/98 |

FOREIGN PATENT DOCUMENTS

| | | |
|---|---|---|
| FR | 636 277 | 4/1928 |
| FR | 1 025 422 | 4/1953 |
| JP | 07042664 | 2/1995 |
| SE | 415 910 | 11/1980 |
| WO | WO 2005/068833 | 7/2005 |
| WO | WO 2005/090781 | 9/2005 |

* cited by examiner

VARIABLE SPEED HUB

The invention relates to a method for speed adjustment of blades rotating in a rotor plane on a wind turbine and a wind turbine with adjustable blades.

BACKGROUND

In the context of wind turbines for power production, the number of revolutions of the blades is adjusted in accordance with the speed of the wind to the effect that as much wind power as possible is converted into electric power. To use to advantage as much as possible of the wind power, the blade tip speed describing the speed of the blade tip is to be adapted to the speed of the wind. This is accomplished by changing the rate of revolution of the blades in pace with the speed of the wind changing. When the wind power is exploited optimally, the speed of the blade tip is proportional to the speed of the wind, meaning that the blade tip speed is increased when the speed of the wind increases and is correspondingly lowered when the speed of the wind slows down.

Today, the blades of a wind turbine are constructed as a rigid rotor, which means that the individual blades in the plant all have the same rate of revolution. This means that the angle between two blades in a wind turbine with a total of three blades is 120°. The speed of the blades can be adjusted by stalling or pitching the blades to the effect that the angle of attack of the wind on the blade is optimised relative to the speed of the wind. When the blade is actively stall-adjusted, the angle of attack is changed to the effect that turbulent air flows are generated across the blade, and hereby the lift of the blade is reduced. Therefore, the blade will be braked when it stalls, but it can be adjusted back to optimise the angle of attack, and the blade will again achieve maximal lift. When the blade is pitch-adjusted, the angle of attack of the wind is changed in the opposite direction compared to a scenario in which active stall-adjustment is performed, and thereby the blade loses its lift, but turbulent flows are not formed across the blade. The rate of revolution of the rotor is adjusted in pace with the wind speed changing, and such adjustment typically takes place on the basis of a measurement of the speed of the wind by means of eg an anemometer. The speed of the wind is typically measured on the nacelle, ie at approximately the same height as the hub of the wind turbine, to the effect that the rate of rotation of the blades is determined on the basis of the wind speed at the hub.

However, the speed of the wind varies with the height above ground and will typically be increasing with increasing height above ground. Therefore each individual blade will meet different wind speeds during a rotation cycle, meaning that the blade is influenced by a relatively high wind speed at the top of the rotation cycle and a lower wind speed at the bottom of the rotation cycle. The rate of rotation of the blades being adjusted on the basis of wind speed at the hub, the blade will have a propensity to go too fast when it is situated in the upper half of its rotation cycle, and too slowly when it is situated in the bottom half of the rotation cycle, which causes forces in the hub. Today, in order to reduce such forces, the blades are individually pitch-adjusted (U.S. Pat. No. 6,604,907; WO2005090781). This is typically accomplished by pitching the blades out of the wind when they are located in the upper half of the rotation cycle, and thereby the lift on the blades is reduced, whereby the blade loses some of its momentum. It is a drawback of this system that the power of the wind cannot be used optimally when the blades are pitched out of the wind due to the speed of the blade tip no longer being optimal relative to the speed of the wind.

HAU E.: "windkraftanlagen" 1996, SPRINGER VERLAG, Berlin, DE, page 172-176 discloses that the blades of a two bladed wind turbine can have different degrees of freedom in order to reduce the loads on the wind turbine due to asymmetric outflow conditions. The degrees of freedom could for instance allow the blades to pendulant in and out of the rotor plane, to be pitched or to be angularly displaced in the rotor plane.

WO 2005/068833 A2 discloses a wind turbine where the pitch of the blades can be varied according to the wind velocity by using a combination of the wind speed and the centrifugal force. The blades are hinged such that they can be rotated/lifted in/out of the rotor plane. The pitch of the blades can hereby be varying according to the wind velocity and the centrifugal force.

FR 1025422 discloses a rotor for e.g. a helicopter or wind turbine. The blade comprises an outer blade part and an inner blade part fastened to the hub. The outer blade part is introduced into the inner blade part in a telescopic way and can be turned around an axis, which is parallel to the main shaft and displaced from the main shaft. The consequence is that the angular displacement in the rotor plane of the outer blade part can be varied.

None of the wind turbines and rotors disclosed in the above-mentioned documents provide sufficient reduction of the loads on the wind turbine, and it is further impossible to optimise the blade tip speed relatively to the speed of the wind.

OBJECT AND DESCRIPTION OF THE INVENTION

It is the object of this invention to describe an alternative method of adjusting the blades of a wind turbine to the effect that the above-mentioned problems are remedied or solved.

This is accomplished by a method for speed adjustment of blades rotating in a rotor plane on a wind turbine, wherein the angle between at least two blades in the rotor plane is changed and where the angle displacement of each blade in the rotor plane is changed individually. This means that the blade tip speed of the blades can be adjusted to the effect that it is optimal relative to the speed of the wind during the entire rotation cycle. This is accomplished by changing the angle displacement of each blade, angle displacement meaning here and in the following the angle in the rotor plane at which the blade is turned away from its initial point or initial conventional setting and thus closer to and/or further away from one of the other blades. By changing the angle displacement of a blade, the rate of revolution of a blade is increased or decreased correspondingly. The blades in the wind turbine can be adjusted to the effect that the angle between the blades is changed relative to the position of a blade in the rotor plane as opposed to a conventional wind turbine, where the angle between the blades is fixed. The result is that the mutual angular distance of the blades is changed in the course of a rotation cycle, as opposed to a standard wind turbine where the blades have a constant angle relative to each other at the hub (e.g. 120 degrees in a wind turbine with three blades). Further, the advantageous aspect is accomplished that, for each individual blade, the blade tip speed can be optimised relative to the speed of the wind. This is a major advantage due to the speed of the wind varying around the wind turbine, and, by optimisation of each individual blade to the speed of the wind, more of the wind power can be used to advantage.

According to yet an embodiment, the angle displacement of the blades in the rotor plane is changed cyclically. Hereby the rate of rotation of each blade is also adjusted cyclically which constitutes a simple, but efficient kind of adjustment which is comparatively readily implemented.

According to yet an embodiment each blade is accelerated while the blade is on its way upwards by the angle displacement being increased. This is advantageous in that the speed of the wind increases with the height and therefore the optimal blade tip speed of the blade increases correspondingly with the height, which is accomplished by accelerating the blade as described.

According to a further embodiment each blade is accelerated while the blade is on its way downwards by the angle displacement being reduced. Correspondingly, as mentioned above, the speed of the blade can hereby be adapted to the variations of the wind as a function of the distance above ground level.

According to yet an embodiment, the speed of the wind, the position of the blade or the speed of the blade are used to adjust the angle displacement of at least one blade in the rotor plane. This means that the angle displacement of the blade, and hence its speed, can be adjusted and controlled as a function of the current, local speed of wind compared the actual position in the rotation cycle of the blade. Likewise, the tip speed of the blade can be monitored and corrected continuously in case it is not optimal relative to the wind.

Correspondingly the acceleration of at least one blade can, according to yet an embodiment of the invention, be used for adjusting the angle displacement of at least one blade in the rotor plane. Hereby the advantageous aspect is accomplished that the acceleration of the blade can be monitored and corrections can be made in case of errors or inaccuracies, if any, in the acceleration of the blade.

According to yet an embodiment, the angle displacement of at least one blade can be changed between −12 and +8 degrees relative to the initial point or initial setting of the blade. Hereby it is ensured that the speed of the blade can be changed in order for it to be optimised to the typical variations in wind speeds around a wind turbine. Moreover, it is ensured that the blades are unable to collide or come too close to each other.

Moreover the invention relates to a wind turbine comprising a rotor with a number of blades, wherein said rotor comprises angular adjusting means, such as e.g. movable supports and flexible joints for individually adjusting the angular displacement in the rotor plane of one of said blades relative to at least one other blade. As mentioned above in the context of the methods according to the invention, this means that the blade tip speed for each blade can be regulated to the effect that it is optimal relative to the speed of the wind in the course of the entire rotation cycle. The result is that the mutual angular distance of the blades can be changed in the course of a rotation cycle as opposed to a standard wind turbine, where the blades have a constant mutual distance (eg 120 degrees in a wind turbine with three blades). The advantages of this are as mentioned above.

Moreover the invention relates to a system of controlling blades in a wind turbine as described above. The control system comprises a central control unit and one or more wind speed meters for measuring the speed of the wind, and said control unit is adapted to use said speed of the wind for controlling the angular displacement of at least one blade in the rotor plane. This means that the speed of the wind can be regulated as a function of the current, actual speed of the wind experienced by the blade and, likewise, the speed of the blade can be adjusted in case changes occur in the speed of the wind. Likewise, the speed of the wind can be deduced from the power signal of the wind turbine, said power expressing the mean speed across the entire rotor.

According to a further embodiment the system comprises one or more position meters for measuring the position of at least one blade, and said control unit is adapted to use said position being used for controlling the angular displacement of at least one blade in the rotor plane. Hereby the advantageous aspect is accomplished that the speed of the wind can be adjusted in response to where in the rotation cycle the blade is currently located. This may contribute to optimising the speed of the blade while simultaneously the speed of the blade can be adjusted relative to the positions of the other blades.

According to a further embodiment the system comprises one or more blade speed meters for measuring the speed of at least one blade, and said control unit is adapted to use said blade speed being used for controlling the angular displacement of at least one blade in the rotor plane. Hereby the advantageous aspect is accomplished that the blade speed can be controlled and corrected if errors or inaccuracies, if any, occur in the blade speed.

Finally, according to a further embodiment the system comprises one or more acceleration meters for measuring the acceleration of at least one blade, and said control unit is adapted to use said one or more blade acceleration for controlling the angular displacement of at least one blade in the rotor plane. Hereby the advantageous aspect is accomplished that the acceleration of the blade can be monitored, and that corrections can be made in case of errors or inaccuracies, if any.

BRIEF DESCRIPTION OF DRAWINGS

In the following the invention will be described with reference to the figures, wherein.

DESCRIPTION OF EMBODIMENTS

Figure 1:
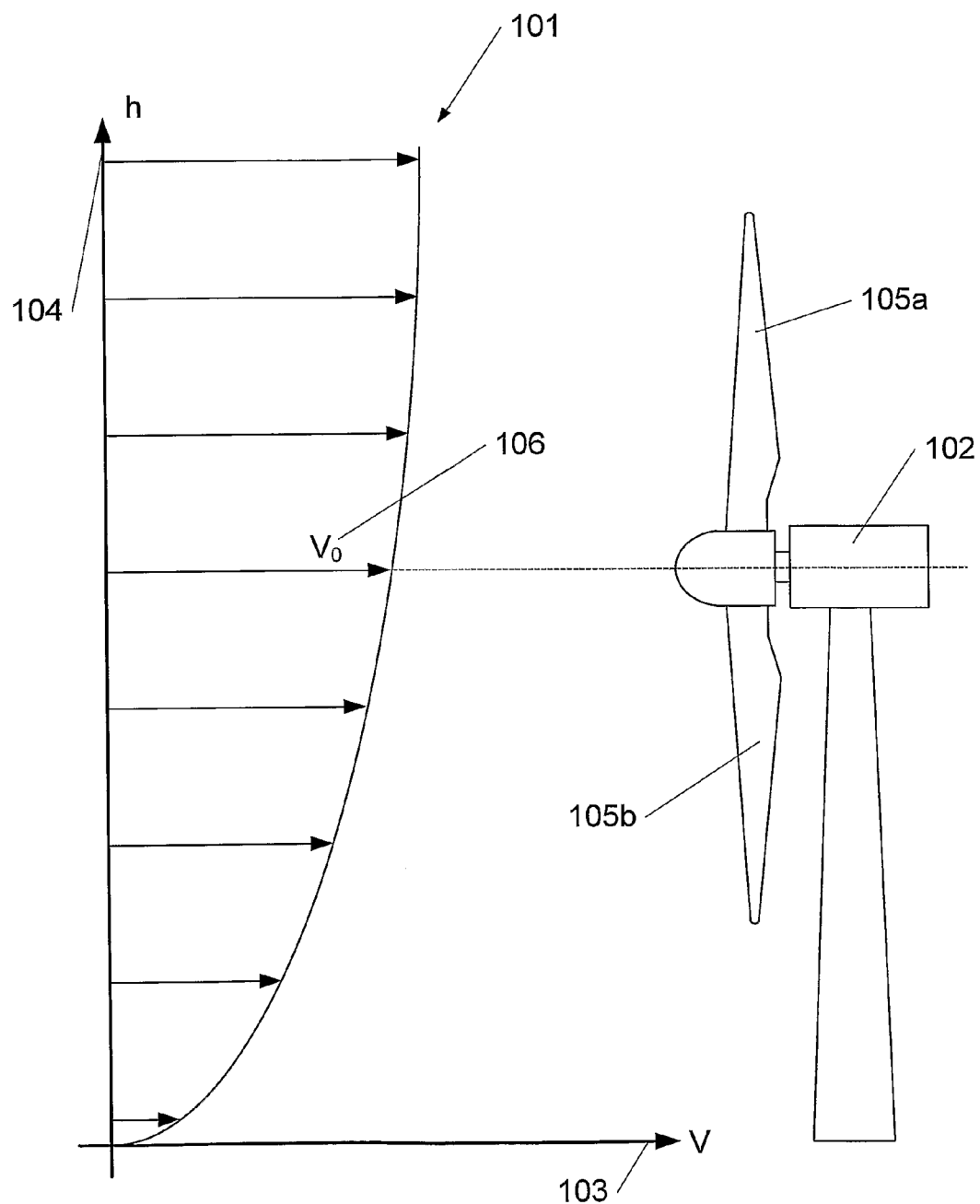
FIG. 1 illustrates a wind profile in front of a wind turbine.

FIG. 1 illustrates a wind profile (101) in front of a wind turbine (102). The speed of the wind, V, is indicated on the horizontal axis (103), whereas the height, h, above ground level is indicated on the vertical axis (104). The shape of the wind profile depends on the terrain in which the profile is to describe the wind, but it applies in general that the speed of the wind is increased when the height increases. Therefore the individual blades of the wind turbine will be influenced by different wind speeds in response to where in the rotation cycle the blade (105a, 105b) is located. Thus, the uppermost blade (105a) experiences a higher speed of wind than the lowermost blade (105b). The speed of the wind at the same height as the hub of the wind turbine is designated $V_0$ (106). In order to use as much power of the wind as possible, each individual blade tip speed is to be adjusted proportionally with the speed of the wind. Therefore, in this invention, the blades in the wind turbine are adjusted such that their speeds are increased when they are exposed to a higher speed of wind. Therefore the uppermost blade (105a) will have a higher rate of rotation than the lowermost blade (105b). Thereby the power of the wind is used more to advantage compared to earlier systems where the rate of rotation is adjusted on the basis of the speed of the wind (106) at the hub of the wind turbine, and where all blades have the same speed during the entire rotation cycle.

Figure 2:
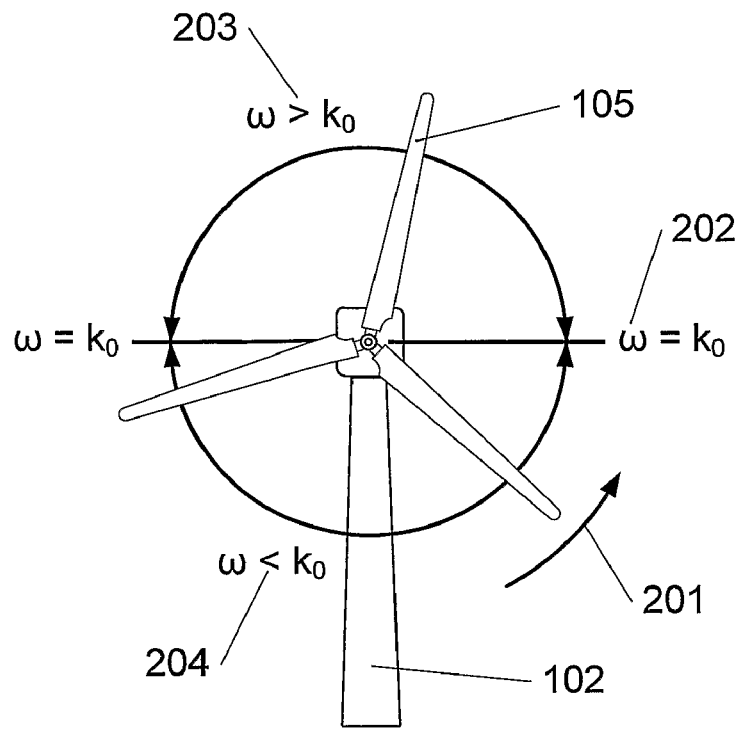
FIG. 2 illustrates where the individual speeds of the blades are typically to be adjusted in accordance with the invention.

FIG. 2 illustrates where the individual speed of the blades can be adjusted in accordance with the invention. The blades of the wind turbine rotate in the direction shown by the arrow (201). The speed of the wind around the wind turbine (102) varies as outlined in FIG. 1, meaning that the rate of rotation of a blade should be changed correspondingly in the course of a rotation to obtain optimal utilisation of the wind power. The optimal rate of rotation, $\omega$, relative to the speed of wind is set to be equal to a constant, $k_0$, (202) at the same height as the wind turbine hub. When the blade (105) is in the upper half (203) of its rotation cycle, where the wind speed is higher, the optimal rate of revolution will also be higher than $k_0$. Conversely, the optimal rate of rotation will be lower than $k_0$ when the blade is in the lowermost half (204) of the rotation cycle.

Figure 3:
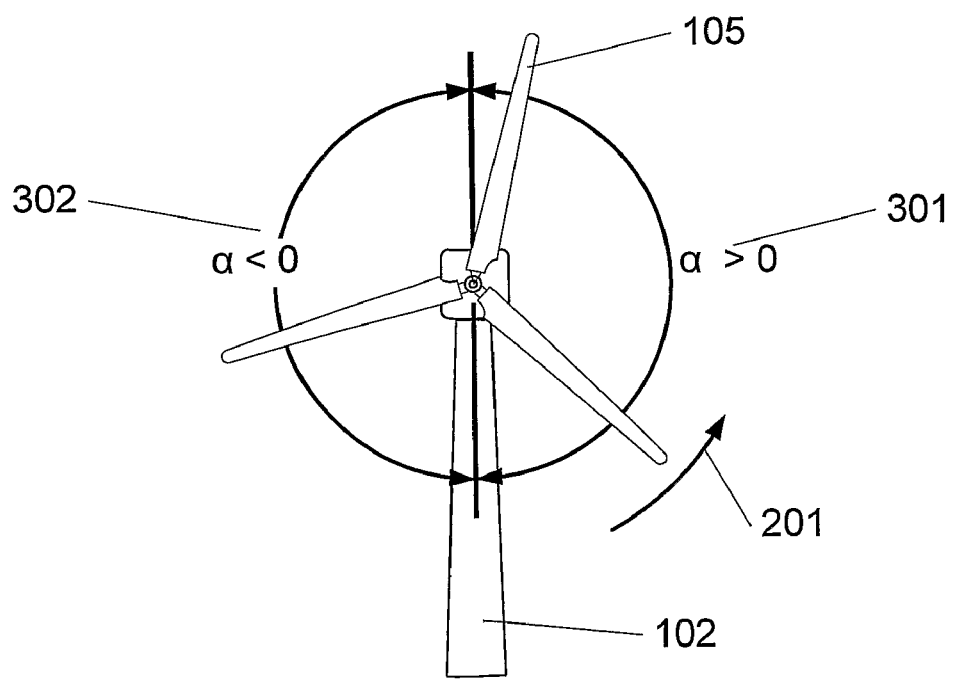
FIG. 3 illustrates where the blades are to be accelerated and decelerated in accordance with the invention.

FIG. 3 illustrates where in a rotation cycle the blades can thus advantageously be accelerated or decelerated pursuant to the invention. The blades of the wind turbine rotate in the direction shown by the arrow (201). In order to accomplish the desired blade tip speed, as described in FIG. 2, the blades have to be accelerated and decelerated in the course of a rotation cycle. The figure illustrates where in the rotation cycle the blades are to be accelerated. Typically, the minimum speed of a blade is at the bottom of the rotation, and therefore the acceleration, $\alpha$, of the blade must be positive, while the blade is ascending, $\alpha>0$ (301) in this area. When the blade has reached the top of a rotation, it has typically reached its maximum speed and therefore the acceleration must be negative (a deceleration) when the blade moves downwards again. The acceleration, $\alpha$, is therefore smaller than zero (302) when the blade is in that area. The shown accelerations are not limiting as to where the blades are to be accelerated according to the invention due to the acceleration also depending on a general increase, if any, or a decrease in the speed of the wind.

Figure 4A:
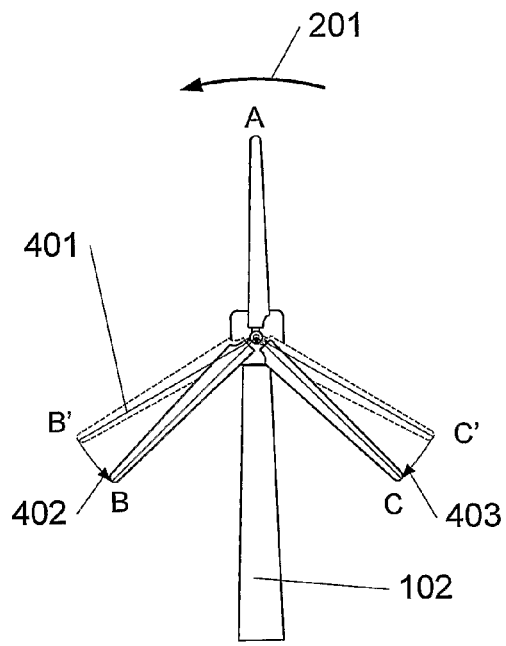
FIGS. 4a-4d illustrate possible blade positions on a wind turbine according to the invention relative to the positions of the blades in a standard wind turbine featuring three blades.
Figure 4B:
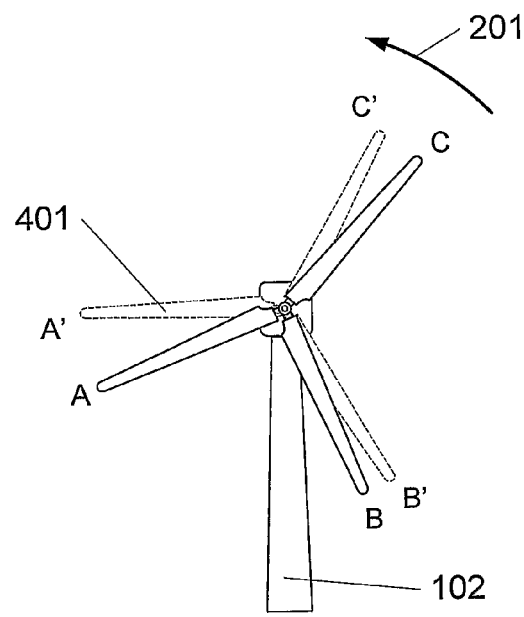
Figure 4C:
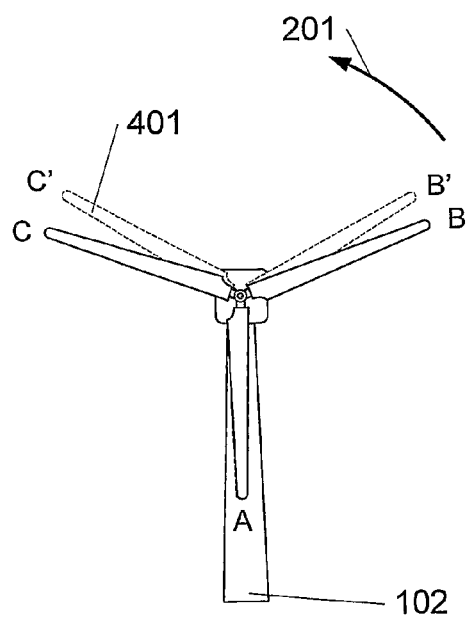

FIGS. 4a-4c illustrate how, in this invention, the position of the blades can be adjusted in accordance with the speed of the wind and relative to each other. The positions of the blades are compared to the positions in a conventional wind turbine (401) with three blades. According to the invention the blades of the wind turbine (A, B, C) can be turned at an angle at the hub relative to the ordinary setting of the blade in a wind turbine (also designated the initial point of the blade), where the angle between the blades is fixed. The result is that the mutual angular distances between the blades can be changed in the course of a rotation cycle, which is contrary to a standard wind turbine featuring three blades, where blades (A', B', C') gave a constant mutual distance of 120 degrees at the hub. The mutual angular distance further along the blade may vary slightly due to the flexing of the blades as a consequence of their own weight. The blades (A', B', C') of a standard wind turbine rotate, as mentioned above, at a constant speed of rotation which is typically determined on the basis of the speed of the wind at the hub. By not maintaining the 120 degrees between each blade, but rather changing the angular displacement of each blade, 402, 403, each blade can be adjusted to run optimally in relation to the speed of wind prevailing at the position of the blade in its cycle of rotation, and thus the variation of the wind can be taken into consideration as a function of the height above ground. FIGS. 4a-4d illustrate four possible positions of the blades of a wind turbine according to the invention.

In FIG. 4a, blade A is at the top of its rotation cycle and here it coincides with a reference blade A', but is running at a higher rotary speed due to its being accelerated as described in FIG. 3. Blade B has a smaller rotary speed than blade B' due to it being in the lower half of its rotation cycle, but it has previously moved relative to blade B' because, in the upper half, it had a larger rotary speed than B'. Therefore, in this figure, the angular rotation (402) of blade B is positive (the same direction as the direction of rotation), and the blade is in front of B', but B' catches up with B. Therefore, in this situation, the angle between blades A and B is larger than 120 degrees. Blade C has a lower speed than blade C', and the angular displacement (403) of C is negative (opposite the direction of rotation). Therefore the angle between blade C and blade A is larger than 120 degrees.

In FIG. 4b, reference blades (A', B', C') have rotated one quarter of a revolution and now it will appear that blade A has overtaken A'. This is due to the fact that, in the upper half, A has a higher speed than A'. B has been overtaken by blade B' due to it having, in the lower half, a lower speed. Blade C is still behind blade C', but has started to catch up with C' due to it being in the upper half of its rotation cycle.

After having rotated a further quarter of revolution (FIG. 4c) blades A and A' coincide again due to blade A' having caught up with A in the course of the last quarter of rotation. Blade B is still behind B', but—as opposed to FIG. 4b—it now catches up with blade B'. During the last quarter of revolution, blade C has overtaken blade C' and still has a higher speed.

Figure 4D:
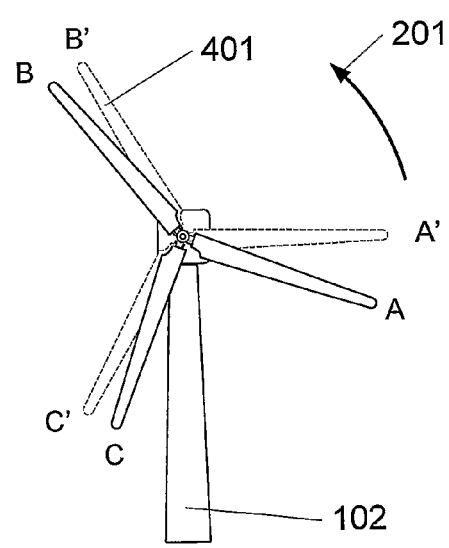

In FIG. 4d, reference blades (A', B', C') has rotated a further quarter of a revolution. During this quarter of a revolution, blade A has had a lower speed than the reference blades and therefore it has been overtaken by blade A'. Conversely, blade B has had a higher speed than the reference blades and therefore it has overtaken blade B'. Now blade C has a lower speed than reference blade C' and it is therefore overtaken by C'.

FIGS. 4a-4c serve merely to illustrate how the speeds of the blades can be adjusted individually relative to the reference blades (A', B', C') due to it being the speed of the wind that decides how fast each blade is to rotate. The figures also illustrate how the mutual angle distance between the blades is changed in the course of a rotation. Thus the angle can be both greater and smaller than the 120 degrees that usually separate the blades of a wind turbine with three blades. According to one embodiment the angle of the individual blade is varied to the effect that, during the rotation, it is shifted between −12 and +8 degrees relative to the initial point or ordinary setting of the blade. Thus the blade is shifted +8 degrees at the top of the rotor plane, while it is shifted −12 degrees at the bottom. This is due to the fact that, typically, the speed of the wind varies logarithmically with the height, and therefore the variations will be larger at the bottom half of the rotation than in the top half of the rotation. The principle according to the invention of changing the angular displacement of each blade in the rotor plane independently of the setting of the remainder of the blades can also be used to reduce the loads on the wind turbine, which may be advantageous in particular in case of elevated wind speeds. Likewise, adjustment of the angular displacement of each blade may be advantageous in evening out turbulence and roads from gusts of wind and the like. Moreover, angular displacements can be used to advantage to attenuate edgewise turns, if any, in the blades which may otherwise cause damage to the blade structure. Finally, an angular displacement of a blade according to the invention can also be used to counteract the flexing of a blade due to its own weight.

Figure 5:
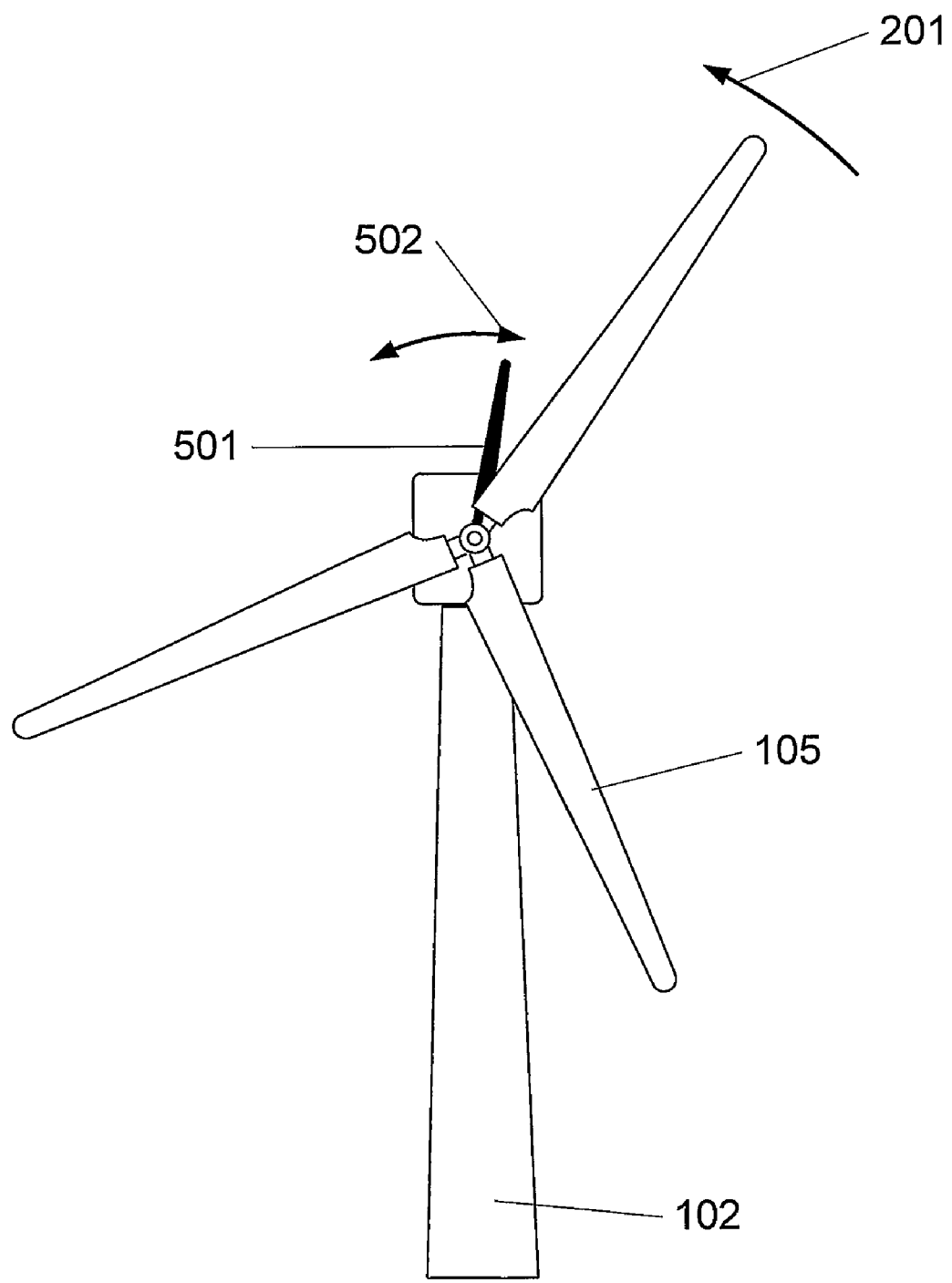
FIG. 5 illustrates an embodiment of the invention where a counterweight has been added.

FIG. 5 illustrates an embodiment of the invention, where a counterweight (501) has been added. The positions of the blades relative to each other in the invention being changed during the rotation, the position of the centre of mass will overall, for all three blades, also change during the rotation. This means that the hub is exposed to too high loads due to the angle of attack of the centre of mass varying. Therefore, in this embodiment, a counterweight is mounted which can be moved or rotated (502) during the rotation to the effect that the centre of mass of the blades remains constant centrally of the hub. According to one embodiment the counterweight is configured as a small blade, but it may have many different configurations—eg that of a cylindrical box, an elongate lever with a weight at the end, etc.

Figure 6A:
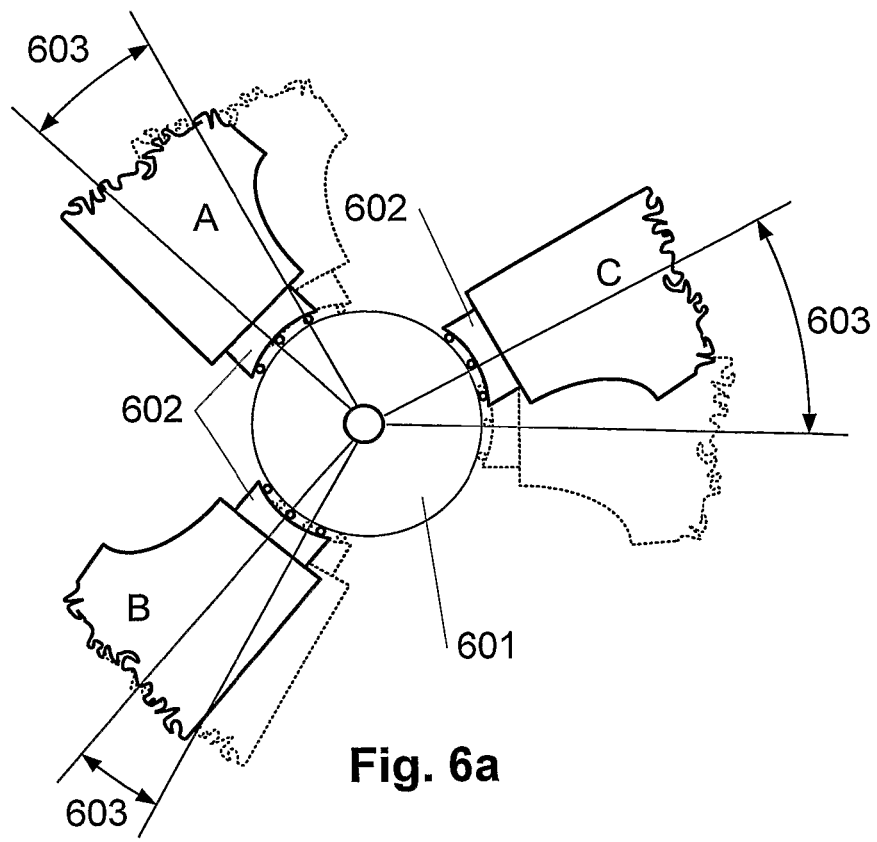
FIG. 6 illustrates the principles of how the position of the individual blade can be changed at the hub.
Figure 6B:
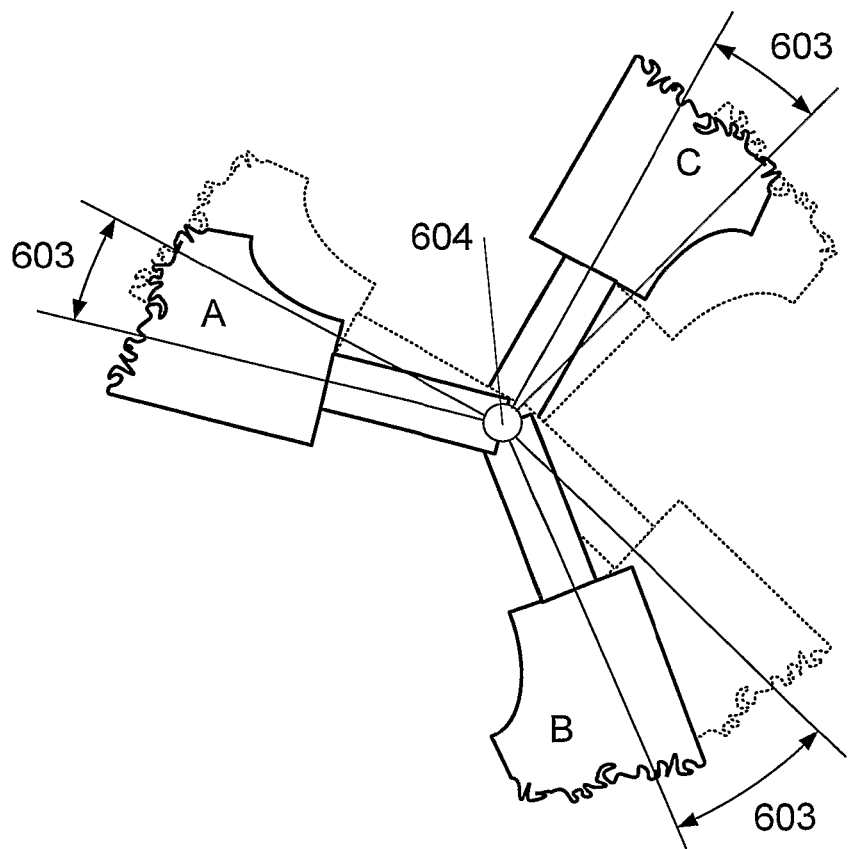
Figure 6C:
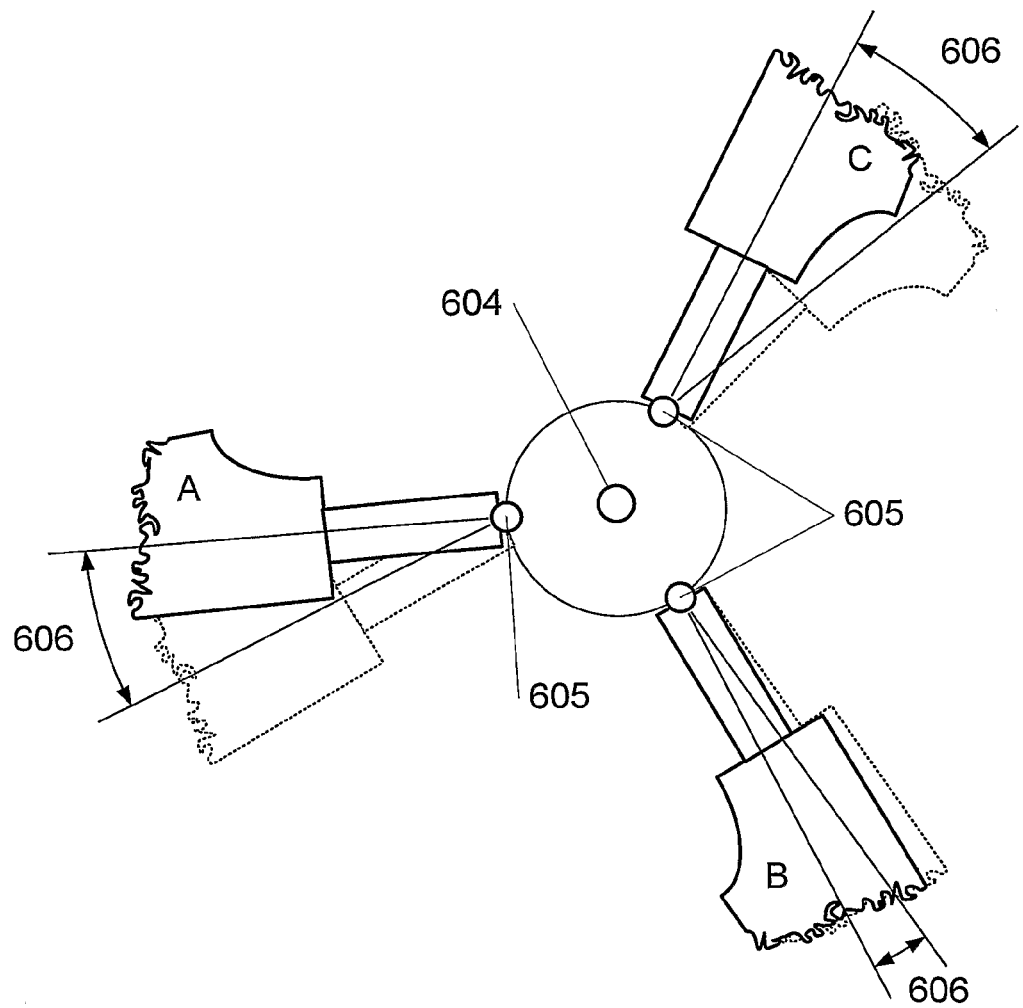

FIG. 6 illustrates the principles of how the angular displacement of the individual blade can be changed in various ways at the hub and with ensuing different patterns of movement, said angular displacements being necessary for being able to change the speed of the individual blade during rotation. The figures outline the hub of a wind turbine with three blades seen from the front and merely serve as examples as it is possible to have both fewer and more than three blades in a wind turbine, and they may be mounted in many different ways to the hub. FIG. 6a shows a hub (601) with three blades (A, B, C), wherein the position of each blade can be changed by shifting the blades around eg a circular path along the exterior of the hub. This may be accomplished eg by securing the blades to a movable support (602) which, eg via bearings and hydraulics, is able to move and turn the blades as shown by arrows (603). FIG. 6b shows three blades (A, B, C) secured to the centre of the hub (604). The position of the blade is, in this embodiment, changed by changing the angle of each blade at the centre of the hub and the movement is indicated by arrow (603). FIG. 6c shows three blades (A, B, C) secured to the hub at a distance from the centre of the hub (604). Here the blades can be turned about an axis (605) which is displaced relative to the axis of the hub to the effect that they can be moved as shown by arrow (606). According to a further embodiment the hub connection is constituted of one or more flexible joints which, when it or they is/are bent, impart to the blade an angular displacement in accordance with the invention. The various embodiments of the blade's connection to the hub can also be combined.

Figure 7:
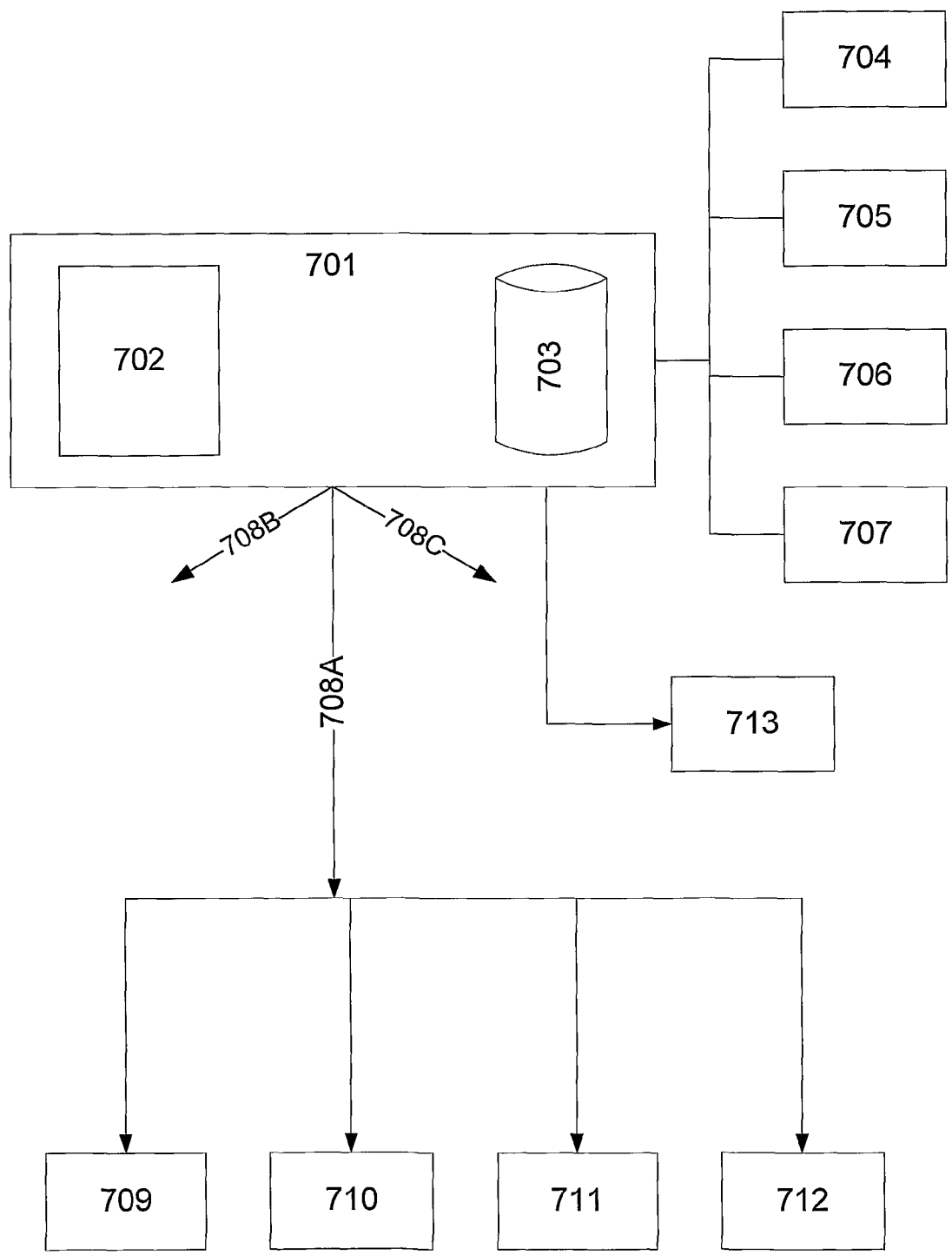
FIG. 7 shows a block diagram of how controlling of the wind turbine can be implemented.

By means of a block diagram, FIG. 7 illustrates how the control and adjustment of the wind turbine with individual variable blade speeds can be implemented. The control is structured around a central control unit (701) which may eg be a computer, microprocessor, PLC or be integrated as a part of the control computer of the wind turbine. It is the task of the control system to coordinate the pattern of movement of the blades such that the blade tip speed of each blade is optimised relative to the speed of the wind. Moreover, the control system also coordinates the patterns of movement of each individual blade relative to the remaining blades of the wind turbine. The control system is programmed (702) in advance with regard to how the blades are to be adjusted/controlled in various situations. The adjustment may take place based on wind profiles stored in the memory (703) of the control system to the effect that the changes in the wind locally around the wind turbine are taken into consideration. Moreover the control system (701) may receive inputs from various sensors (704, 705, 706, 707), as will be described in further detail below, and they may partake in the coordination of the movement of the blades. The control system may adjust each individual blade (708A, 708B, 708C) by increasing or decreasing the angular rotation of each blade and hence accelerating (709) or decelerating (710) the blade. Moreover, the blade can also be pitch/stall regulated (711) and an emergency brake (712) can be activated. Each blade in the wind turbine can be controlled in this manner, but the figure shows only the blocks of one blade (708A) in detail. Finally, one or more counterweights (713), if any, are controlled such that the centre of mass of the blades is at all times at the centre of the hub.

One input may come from a wind speed meter (705) based on eg an anemometer or an ultrasound or laser measurement, both of which are able to measure the speed of the wind on the basis of the reflection by the air particles of the sound or the light. One measurement of the speed of the wind may, in combination with the wind profiles (703), be used to decide when the blades can advantageously be accelerated or decelerated. This may occur eg by comparing the stored blade profiles to the wind speeds and may is be accomplished as a cyclic adjustment to the effect that a blade will, as a starting point, experience the same adjustment in each rotation. Moreover the measurement can be used to decide how the blade is to be pitch or stall adjusted (711) to achieve optimal utilisation of the power of the wind. Finally, wind measurements by ultrasound or laser can be used to determine the speed of the wind a distance in front of the blade whereby the movements of the blades are optimised prior to the wind hitting the turbine, meaning that the blades can be adjusted to always be set correctly relative to the speed of the wind. The speed of the wind by which each blade is hit can also be measured which means that the setting of each blade can be optimised individually to the speed of the wind.

Another input may be a position meter (704) which is able to record the positions of the various blades such that the control system is, at all times, able to use the position of the blades in the coordination and adjustment. This or these position meters can be based on eg GPS measurements in each individual blade or by recording a video sequence of the blades. The position of the blades may partake in eg the adjustment of the counterweight to the effect that the overall centre of mass of the blades is at all times kept constant in the centre of the hub. Moreover the position of the blades can be used to decide whether the blades are to be accelerated or decelerated. This can be done by using the stored wind profiles (703) in combination with the position of the blade and thereby provide information whether the blade is to be accelerated or decelerated. Finally, the position meters can be used to decide whether the blades are to be emergency-braked, eg if one or more blades has/have come too close to their extreme positions.

A third and a fourth input may be measurement of the acceleration (706) or the speed (707) of the blades. These measurements can be used by the control system to check whether the blades react as planned, and thereby the control system is able to interfere if that is not the case. Finally the measurements can be used to control the counterweight (713). An acceleration and speed meter may be constructed eg by mounting piezoelectric transducers in various places on the blade by using a laser vibrometer which is able to measure accelerations and speeds based on a laser beam reflected on the blade or by using a GPS transmitter mounted on the blades.

The shown block diagram serves merely to illustrate how the control system can be configured. It is easy to set up the control system such that one or more of the shown components can be omitted and, likewise, several of the inputs can be used simultaneously during the adjustment.

It will be understood that the invention as taught in the present specification and figures can be modified or changed while continuing to be comprised by the protective scope of the following claims.

The invention claimed is:

1. A method for speed adjustment of blades (105) rotating in a rotor plane of a wind turbine (102), where the angle between at least two blades in the same rotor plane is changed characterised in that the angular displacement of each blade in the same rotor plane is changed individually.

2. A method for speed adjustment according to claim 1, characterised in that the angular displacement of the blades in the rotor plane is changed cyclically.

3. A method for speed adjustment according to claim 1, characterised in that at least one blade is accelerated (301) while the blade is ascending.

4. A method for speed adjustment according to claim 1, characterised in that at least one blade is decelerated (302) while the blade is descending.

5. A method for speed adjustment according to claim 1, characterised in comprising use of the speed of the wind for adjusting the angular displacement of at least one blade in the rotor plane.

6. A method for speed adjustment according to claim 1, characterised in further comprising use of the position of at least one blade for adjusting the angular displacement of at least one blade in the rotor plane.

7. A method for speed adjustment according to claim 1, characterised in further comprising use of the speed of at least one blade for adjusting the angular displacement of at least one blade in the rotor plane.

8. A method for speed adjustment according to claim 1, characterised in further comprising use of the acceleration of at least one blade for adjusting the angular displacement of at least one blade in the rotor plane.

9. A method for speed adjustment according to claim 1, characterised in that the angular displacement of at least one blade is changed between −12 and +8 degrees relative to the initial point (A, B, C) of the blade.

10. A wind turbine comprising a rotor with a number of blades (105), characterised in that said rotor comprises angular adjusting means (602, 604, 605) for individually adjusting the angular displacement in the same rotor plane of one of said blades relative to at least one other blade in said same rotor plane.

11. A wind turbine as described in claim 10, wherein said angular adjusting means (602, 604, 605) includes movable supports and flexible joints.

12. A system for controlling blades of a wind turbine as described in claim 10, said system comprises a central control unit, characterised in that said system further comprises one or more wind speed meters (705) for measuring the speed of the wind, and in that said control unit is adapted to use said speed of the wind for controlling the angular displacement of at least one blade in the rotor plane.

13. A system according to claim 12, characterised in further comprising one or more position meters (704) for measuring the position of at least one blade, and in that said control unit is adapted to use said position for controlling the angular rotation of at least one blade in the rotor plane.

14. A system according to claim 12, characterised in further comprising one or more blade speed meters (707) for measuring the speed of at least one blade, and in that said control unit is adapted to use said blade speed for controlling the angular displacement of at least one blade in the rotor plane.

15. A system according to claim 12, characterised in further comprising one or more acceleration meters (706) for measuring the acceleration of at least one blade, and in that said control unit is adapted to use said blade acceleration for controlling the angular displacement of at least one blade in the rotor plane.

* * * * *